United States Patent
Hornung

(10) Patent No.: US 9,925,910 B2
(45) Date of Patent: Mar. 27, 2018

(54) TRANSPORT CARRIAGE FOR CARGO

(71) Applicant: Hubert Hornung, Unterschneidheim-Zoebingen (DE)

(72) Inventor: Hubert Hornung, Unterschneidheim-Zoebingen (DE)

( * ) Notice: Subject to any disclaimer, the term of this patent is extended or adjusted under 35 U.S.C. 154(b) by 0 days.

(21) Appl. No.: 14/889,747

(22) PCT Filed: Feb. 11, 2014

(86) PCT No.: PCT/EP2014/052605
§ 371 (c)(1),
(2) Date: Jan. 14, 2016

(87) PCT Pub. No.: WO2014/180578
PCT Pub. Date: Nov. 13, 2014

(65) Prior Publication Data
US 2016/0121781 A1    May 5, 2016

(30) Foreign Application Priority Data

May 10, 2013 (DE) ........................ 10 2013 208 659

(51) Int. Cl.
*B60P 7/08* (2006.01)
*B62D 33/02* (2006.01)

(52) U.S. Cl.
CPC ............ *B60P 7/0823* (2013.01); *B62D 33/02* (2013.01)

(58) Field of Classification Search
CPC .............................. B60P 7/0823; B62D 33/02
USPC ............ 410/12, 97, 100, 103; 254/214, 242, 254/278–279, 294; 248/499
See application file for complete search history.

(56) References Cited

U.S. PATENT DOCUMENTS

| | | | |
|---|---|---|---|
| 5,876,164 A | * | 3/1999 | Hamelin .................. B60P 7/08 410/100 |
| 6,779,828 B1 | | 8/2004 | Poyntz |
| 7,189,042 B1 | | 3/2007 | Schmit |
| 8,226,150 B1 | | 7/2012 | Schmeichel et al. |
| 2008/0231069 A1 | | 9/2008 | Petelka |

FOREIGN PATENT DOCUMENTS

| CA | 2450341 A1 | 5/2005 |
|---|---|---|
| DE | 20 2007 019 318 U1 | 1/2012 |
| DE | 10 2011 010 379 A1 | 8/2012 |

OTHER PUBLICATIONS

Prouteau, Evelyne, "International Search Report and Written Opinion re Application No. PCT/EP2014/052605", dated May 16, 2015, Published in: PCT.

* cited by examiner

*Primary Examiner* — Stephen T Gordon
(74) *Attorney, Agent, or Firm* — Neugeboren O'Dowd PC

(57) ABSTRACT

The invention relates to a transport carriage for cargo, particularly balls compressed from agricultural crops such as straw or silage, having a loading platform, which is designed to reach under the cargo in the loading state of the transport carriage, and having a strapping system which enables the cargo to be secured on the loading platform. The strapping system has comprises at least one, preferably a plurality of tensioning devices, arranged spaced apart from each other, which can be guided around the cargo loaded on the loading platform, at least in sections, by a common conveying device.

14 Claims, 7 Drawing Sheets

TRANSPORT CARRIAGE FOR CARGO

The invention relates to a transport carriage for cargo. In some embodiments, in addition to cargo made up of agricultural crops in particular in the form of compressed round or cuboid bales, such transport carriages are also able to be used for compressed waste paper, plastic bales or materials compressed in other ways, for loaded pallets, boxes and the like and for trunk wood and other similar cargo.

The term "transport carriage" in this case encompasses all types of vehicle, amongst others heavy goods vehicles and the like, as well as trailers and trailer systems for such vehicles.

In known transport carriages the cargo is generally loaded on the loading platform and subsequently secured by straps. In this case, it is common practice to provide straps at uniform intervals which are wrapped around the loading platform and the cargo and tension the cargo against the loading platform. In practice, however, it is a drawback that the individual straps have to be separately attached and tensioned, whereby the loading process is time-consuming. Moreover, two operators and/or users are often required in order to wrap and to secure the individual straps around the cargo.

In view of this problem, a transport carriage for cargo known from the prior art has been proposed and, instead of a strapping system for securing the cargo arranged on the loading platform, said transport carriage provides movable side walls which secure the cargo. Thus the German utility model DE 20 2007 019 318 U1 discloses a transport carriage, the longitudinal side walls thereof and/or at least one of the longitudinal side walls thereof having a support device, the respective longitudinal side wall thereof being able to be displaced from an open position in the vicinity of the ground into a closed position encompassing at least one upper position of the stacked cargo and securing said cargo to the side. Although this solution provides advantages in practical use, for example, it may be a drawback that this system only functions when the lower bale layers (i.e. the bale layers in the vicinity of the platform) are not considerably wider than the upper bale layers.

The system known from the prior art, therefore, has reduced flexibility with regard to the loaded cargo than the known method of strapping the cargo disclosed above.

A further solution from the prior art is disclosed in the publication DE 10 2011 010 379 A1. This document proposes a device for the simple securing of stacks of goods by means of securing straps, wherein the device comprises at least two guide rails which are arranged above the load to be secured, at least two mounting rails which are provided in a mounting position and at least two transfer rails which are able to be moved from a first position in which the transfer rails are aligned with the mounting rails into a second position in which the transfer rails are aligned with the guide rails and are able to be displaced in a movable manner in the rails for retaining at least one security strap. The security straps are arranged above the load so that the free ends of the security straps hang down to the side adjacent to the load and the free ends of the security straps are locked on a loading floor and at the same time released from a retaining device holding said security straps and thus from the associated rails.

This relatively complex rail arrangement may be arranged, for example, in a warehouse and the load to be secured is displaced below the rail arrangement in order to be strapped. A drawback here is that the rail arrangement is not part of the transport carriage and, therefore, is not able to be used in any location (for example, for agricultural use in the fields).

Finally, it is well known from the prior art to close heavy goods vehicle trailers which are open at the top by means of a tarpaulin in order to protect the load to be transported, for example from rain and wind (see also U.S. Pat. No. 8,226, 150 B1).

Accordingly, the object of the present invention is to provide the advantages of flexible straps for securing cargo without having to take into account the drawbacks associated therewith from the prior art.

The present invention achieves this object by a transport carriage having one or more features described herein.

According to the invention, a transport carriage for cargo is proposed, said transport carriage having a loading platform which is able to reach under the cargo in the loaded state of the transport carriage and a strapping system which permits a securing of the cargo on the loading platform and comprises at least one, preferably a plurality of, tensioning means which are arranged spaced apart from one another and which may be guided at least in sections around the cargo loaded onto the loading platform by means of a common conveying device. The invention serves, in particular, for tensioning the loaded cargo against the loading platform. Moreover, the loading platform at its front ends is preferably defined by transverse side parts which comprise the conveying device of the strapping system. In this case, it is possible that the conveying device of the strapping system is provided on only one of the two transverse side parts or on both transverse side parts.

Alternatively or additionally conceivable is the provision of the conveying device of the strapping system on one or both of the longitudinal side parts of the transport carriage.

For example, tensioning straps may be used as tensioning means. Alternatively, however, the design of the tensioning means in the form of a net-like structure or even a tensioned film is conceivable and may be advantageous depending on the loaded cargo. A tensioning film in this case may additionally take on the function of protecting the enclosed cargo from external influences, such as for example rain.

In practice, the use of a plurality of tensioning straps as tensioning means has proved expedient in that the tensioning straps already disclosed here may be used, wherein the particularity of the present invention is that these tensioning straps may be guided and tensioned around the cargo at least in sections by means of a common conveying device.

Therefore, with the present invention it is no longer necessary for the user to wrap and secure each individual tensioning strap separately around the cargo. Instead, this is carried out by a common conveying device so that it is even possible for an individual user, without the help of a second user, to secure the loaded cargo on the transport carriage easily and rapidly.

The tensioning means as proposed above have the advantage relative to the grid structure known from the prior art (see DE 20 2007 019 318 U1) in that they are built to be relatively lightweight and dimensionally flexible and if required may be replaced easily and cost-effectively in the event of damage.

It may also be provided that the at least one tensioning means of the strapping system is arranged along one of the longitudinal sides of the loading platform in order to be guided at least in sections in a direction transversely to the longitudinal extent of the transport carriage around the cargo loaded on the loading platform by means of the conveying device. As is disclosed in more detail hereinafter, it is not necessary here for the at least one tensioning means to be guided entirely around the cargo loaded on the loading platform. Alternatively, it may even be sufficient to enclose an angle of, for example, approximately 120° and at the same time still ensure sufficient securing of the cargo. It is important that the securing of the cargo takes place by strapping against the loading platform.

The strapping system may also comprise a tensioning device for tensioning the at least one tensioning means. Thus the tensioning device may comprise a tensioning shaft which is rotatable about its longitudinal axis, on which the at least one tensioning means is able to be at least partially wound on and off. Preferably, the tensioning shaft may have at least one slot-shaped opening, the at least one tensioning means being able to extend therethrough Alternatively or additionally, the tensioning device may comprise a shaft for tensioning the tensioning means, wherein by rotating the axle about the longitudinal axis thereof the at least one tensioning means is able to be wound on and off said axle. In this case, the shaft fulfills the function of tensioning or, in a variant in which a tensioning shaft is also attached, pretensioning.

Alternatively or additionally, the tensioning device may comprise a hollow shaft and an axle arranged therein, wherein the at least one tensioning means is able to be wound on and off by rotating the axle relative to the hollow shaft. In this variant, the axle with the hollow shaft fulfills the function of tensioning or, in a variant in which a tensioning shaft is also attached, pretensioning the tensioning means.

In this case the hollow shaft preferably has at least one slot-shaped opening, a free end of the at least one tensioning means being able to protrude to the outside through said slot-shaped opening.

Thus, the tensioning device serves in all variants for tensioning the at least one tensioning means as soon as this tensioning means is guided with the desired angle of contact around the loaded cargo. In this case, the at least one tensioning means, for example in one embodiment with a hollow shaft and an axle received therein, may be wound by a rotational movement of the axle relative to the hollow shaft surrounding said axle. In practice, the axle is uniformly rotated and the tensioning means wound onto the axle, whilst the hollow shaft does not perform a rotational movement. In the wound-on state the at least one tensioning means, with the exception of its free end which protrudes outwardly through a corresponding opening in the hollow shaft, is almost completely received inside the hollow shaft. In this manner, a particularly uncomplicated and secure storage of the tensioning means of the strapping system is additionally provided. In principle, however, it is alternatively also conceivable that the hollow shaft performs the rotational movement or the tensioning means is wound onto the external hollow shaft.

The at least one tensioning means may be connected at least at one end portion fixedly in terms of rotation to a component of the tensioning device, whereby the rotation of the shaft, the axle or the hollow shaft results in the at least one tensioning means being wound on and, in reverse, the unwinding of the at least one tensioning means results in a rotation of the shaft, the axle or the hollow shaft.

In one embodiment which comprises only the tensioning shaft for tensioning the tensioning means, by rotating the tensioning shaft the tensioning means may be wound thereon and/or unwound therefrom.

In a region in which the at least one tensioning means is able to be wound onto and off a component of the tensioning device, the tensioning device may also provide a greater degree of static friction between this component of the tensioning device and the tensioning means.

The tensioning device may also comprise at least one drive unit which serves for driving the rotating part of the tensioning device, for example the axle arranged in the hollow shaft, the shaft or the tensioning shaft, and initiates the relative rotational movement. The drive unit in this case replaces a manual drive by a user, for example a crank or the like, and thereby permits an even more convenient operation of the strapping system.

As a whole, the hollow shaft may have a single slot-shaped opening, through which all free ends (with a plurality of tensioning means) extend, or in each case an opening which is assigned to a tensioning means. The same applies to the at least one slot-shaped opening of the tensioning shaft, the tensioning means being able to extend through the tensioning shaft through said slot-shaped opening.

Furthermore, the tensioning device may have an overload protection such that a tensioning and/or winding-on of the at least one tensioning means is only possible up to a predetermined threshold value. If this threshold value (for example a tensile force value of approximately 25 N) is exceeded, the overload protection prevents the torque, which is introduced by the drive unit or manually by the user, being transmitted to the at least one tensioning means. The overload protection may, for example, be configured in the manner of a ratchet coupling, a torque limiter or the like, and ensures that the tensioning means are not subjected to a tensile force which is inadmissibly high. In this manner, the service life of the tensioning means may be increased.

In a first variant, the overload protection may be provided, for example, on the interface of the drive unit and the rotating component of the tensioning device, for example the shaft or axle, and when said shaft or axle is fixed due to the tensile forces acting on the tensioning means, may interrupt the force transmission from the drive unit to the shaft or axle. In this case, with a plurality of tensioning means, none of the tensioning means would have to be retensioned again.

Instead of the overload protection in the region of the interface of the drive unit and the shaft or axle, however, it may also be provided that each tensioning means is provided with an overload protection in the connecting region with the rotating component of the tensioning device. In this manner, the individual tensioning means of the strapping system may be tensioned independently of one another to a predetermined maximum tensile force, which is advantageous in particular if the loading platform is not evenly loaded with cargo. One conceivable embodiment, for example, provides strap-shaped tensioning means which may be wound onto strap rollers, wherein each strap roller is connected via an overload protection (ratchet coupling) to the shaft or axle. If the tensile force acting on a strap exceeds a specific threshold value, the ratchet coupling slips so that the rotational movement of the shaft or axle is no longer transmitted to the associated strap roller.

Alternative embodiments to the aforementioned systems of an overload protection are naturally also conceivable.

In a particularly advantageous variant, at least one component of the tensioning device is [provided] for pretensioning the at least one tensioning means and the tensioning shaft serves, in particular, for securing the at least one pretensioned tensioning means. Thus as set forth above, the tensioning device may be protected by an overload protection from an overload of the system as a result of the rotational movement for winding on and unwinding the tensioning means. This has the result, however, that when the transport carriage inadvertently overturns, the overload protection yields due to the load of the cargo which has also overturned and as a result the load is no longer secured. Even in such cases, however, an additional securing of the load is desirable. To this end, the tensioning shaft may be used as an additional component of the tensioning device.

After the tensioning process has been carried out by means of the shaft, axle and hollow shaft, or other components conceivable as pretensioners with an overload protection, the tensioning shaft is also rotated by a predetermined angle, for example by 180° about its longitudinal axis. The at least one tensioning means extends through the slot-shaped opening through the tensioning shaft and is moved by the rotation thereof so as to bear directly against the outer surface of the tensioning shaft. This may be provided, as set forth above, at least partially by a coating, a surface structure or with additional elements (such as for example spikes or rubber elements) which provide greater static friction of the supporting tensioning means. In this manner, the at least one tensioning means is secured in its tensioned state by the existing static friction on the tensioning shaft.

The tensioning shaft itself may either be fixed mechanically in this securing position, for example by a retaining pin which is engaged both with the tensioning shaft and a fixed part of the transport carriage. Alternatively, the securing may also take place via the drive of the tensioning shaft. A hydraulic drive of the tensioning shaft is, for example, conceivable, wherein a locking valve retains the tensioning shaft thereon in the securing position. Alternatively or in combination with the hydraulic drive, a toothed rod may also be used, said toothed rod in turn being mechanically fixed in a position in which the tensioning shaft is located in its securing position.

It may also be provided that the conveying device comprises at least one guide rope and/or guide bar, the at least one tensioning means being able to be connected thereto such that it may be guided by means of the guide rope or the guide bar at least in sections around the cargo loaded onto the loading platform.

In this embodiment, for example, the free end of the at least one tensioning means may be connected to the guide rope or the guide bar. When a plurality of tensioning means are provided, with a displacement of the guide rope or the guide bar, this logically results in all tensioning means connected thereto also being able to be accordingly displaced, whereby the effect according to the invention is achieved that the individual tensioning means do not have to be separately passed around the cargo.

In the variant with a guide bar, the guide bar may advantageously encompass the tensioning device or components thereof for tensioning or securing the at least one tensioning means. In this manner, a functional combining of the guide bar and the tensioning device may be achieved, whereby due to a lower number of individual parts the strapping system may be produced more simply and more cost-effectively.

The conveying device may also comprise at least one, preferably two, retaining arms for guiding and retaining the guide rope or the guide bar, wherein the at least one retaining arm is arranged on one of the transverse side parts. In particular, a drive device may be assigned to the at least one retaining arm, the at least one retaining arm being able to be displaced thereby for guiding and retaining the guide rope or the guide bar relative to the loading platform. The at least one retaining arm serves, therefore, both for transmitting a displacement movement to the guide rope and/or to the guide bar and also for retaining the guide rope or the guide bar in the corresponding position.

Alternatively to a retaining arm, however, at least one, preferably two, retaining frames may be provided for guiding and retaining the guide rope or the guide bar, wherein the at least one retaining frame is arranged on one of the transverse side parts. In contrast to the at least one retaining arm, the at least one retaining frame may also comprise at least one guide rail, a portion of the guide rope or the guide bar being able to be directly or indirectly received therein so as to be guided. For example, it is conceivable to fasten to the free ends of the guide rope in each case a pin or the like which in turn may be guided in the guide rails of two retaining frames attached to the transverse side parts of the transport carriage. A fixing device (for example a clamping screw or the like) may be additionally provided on the pin, said fixing device being able to produce a fixing of the portion of the guide rope relative to the guide rail, as soon as this is desired. Moreover, a connecting part, for example in the form of a rigid bar, may be arranged between the pin acting as guide part and the respectively assigned portion of the guide rope, in order to enlarge the strapping radius relative to the retaining frame. The same functional principle may naturally also be transferred to a guide bar.

Finally, a drive device may be assigned to the at least one retaining arm or alternatively to the at least one retaining frame, the at least one retaining arm or the portion of the guide rope or the guide bar which is received in the guide rail being able to be displaced thereby relative to the loading platform.

As a result, the above-described transport carriage with its strapping system may be operated both manually by a single user who, for example, transfers the retaining arm or the portions of the guide rope or the guide bar received in the guide rail into a desired position for securing the loaded cargo and secures the cargo in this position. However, alternatively the embodiment with a drive device is also conceivable and, in particular, this is advantageous if a transport carriage for cargo which is particularly easy to operate is desired.

A corresponding drive device may, for example, be operated electrically, hydraulically or pneumatically. It may be advantageous that the drive device is also designed to retain the retaining arm or the respective portion of the guide rope or the guide bar in the desired position for securing the cargo. Alternatively or additionally, however, a securing system may also be provided, for example a device for hooking or latching the guide bar or the guide rope in the desired position.

In a development of the present invention, a deflection device may also be provided for deflecting at least one tensioning means, wherein the at least one tensioning means is guided at least in sections in a direction substantially parallel to the longitudinal axis of the loading platform by means of the deflection device.

In practice it has been shown that, for example, the tensioning device or at least a large proportion of its components may be received in a particularly space-saving manner and securely in the region of the underbody of the transport carriage and/or attached thereto. In such a design, however, the maximum extent of the components of the tensioning device in the longitudinal direction (parallel to the longitudinal axis of the loading platform) is limited by the wheel axles of the transport carriage. As, however, the region of the loading platform which is located above the wheel axles of the transport carriage is also intended to be used to receive and secure cargo, it is necessary to deflect at least one tensioning means at least partially from the region between the wheel axles (in which the tensioning device may be attached) into a region above the wheel axles. The deflection device is used for this purpose.

Said deflection devices may comprise, in particular, at least one pair of pulleys which are assigned to a tensioning means and which permit the assigned tensioning means to deflect in the desired manner. To this end, the tensioning means, for example a tensioning strap, may be crossed over a first time by means of the first pulley and deflected in this manner by 90°, wherein as a result of it being crossed over the tensioning means no longer extends substantially transversely to the longitudinal axis of the loading platform but parallel. By means of the second pulley, the tensioning means may be crossed over again and at the same time deflected by 90°, wherein as a result of being further crossed over the tensioning means then no longer extends substantially parallel to the longitudinal axis of the loading platform but again transversely. It is, therefore, possible to enclose and tension the cargo which is located above the wheel axles on the loading platform.

The present invention is described hereinafter in more detail with reference to the accompanying drawings, wherein these preferred embodiments of the invention in which the individual features of the invention are combined together are shown by way of example. The person skilled in the art, however, will naturally be able to consider these separately from one another and/or combine them to form expedient combinations.

In the drawings, schematically:

FIG. 1b shows a rear view of the transport carriage according to FIG. 1a;

FIG. 2a shows a side view of a transport carriage according to the invention according to a first embodiment;

FIG. 2b shows a rear view of the transport carriage according to the invention according to FIG. 2a;

FIG. 3a shows a side view of a transport carriage according to the invention according to a second embodiment;

FIG. 3b shows a rear view of the transport carriage according to the invention according to FIG. 3a;

FIG. 4b shows a rear view of the transport carriage according to the invention according to the embodiment of FIG. 4a;

FIG. 4c shows a rear view of the transport carriage according to the invention according to an alternative sixth embodiment.

Figure 1A:
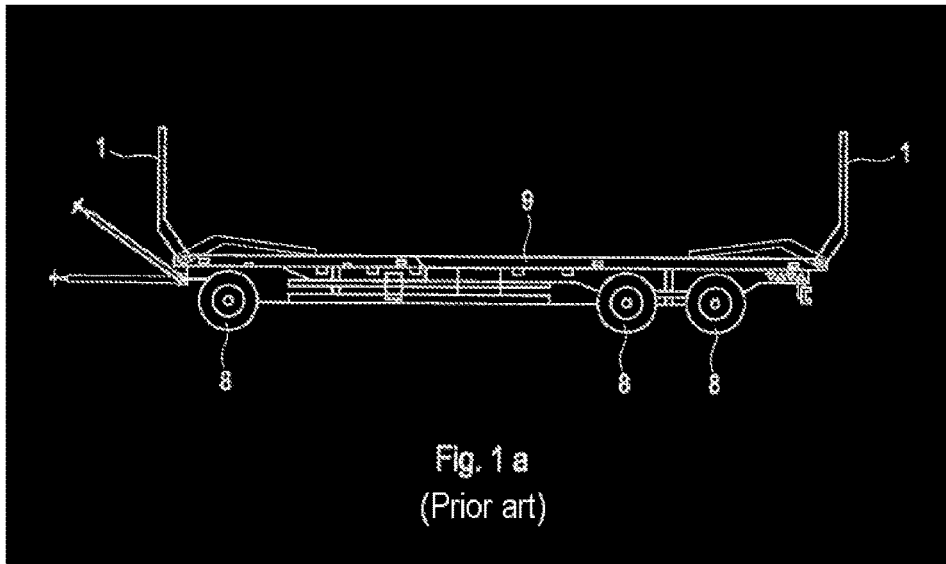
FIG. 1a shows a side view of a transport carriage according to the prior art.
Figure 1B:
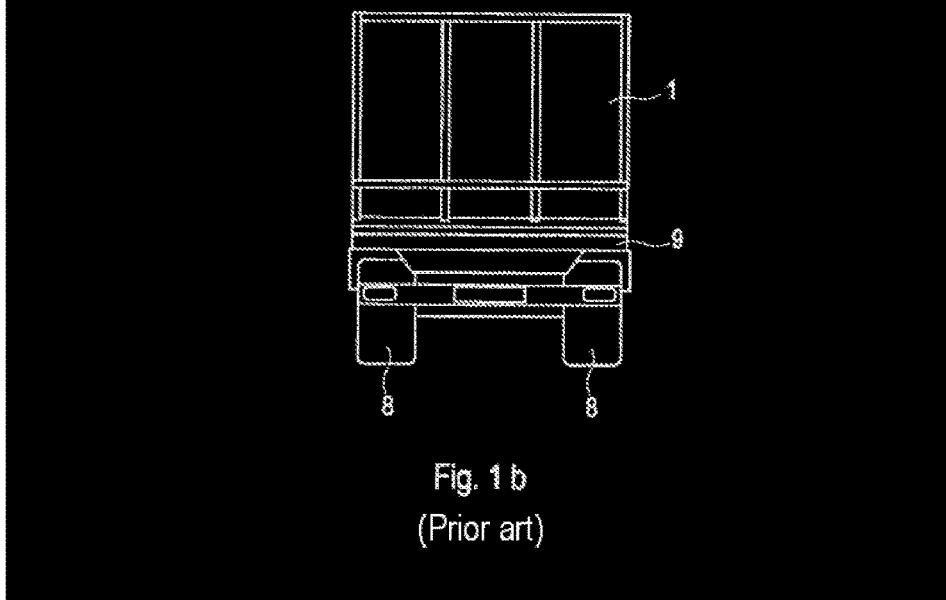

In FIGS. 1a and 1b generally a transport carriage is shown as known from the prior art. This transport carriage comprises a carriage frame 9 which at the same time also provides the loading platform for the cargo to be transported. The loading platform is defined at its front ends (to the front and rear in FIG. 1a) by transverse side parts 1. The carriage frame 9 is supported via the chassis and the wheel axles above the wheels 8 of the transport carriage.

Figure 2:
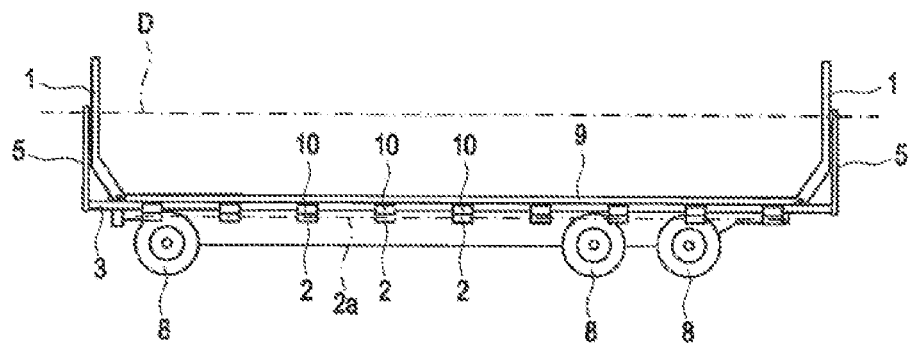
Figure 2:
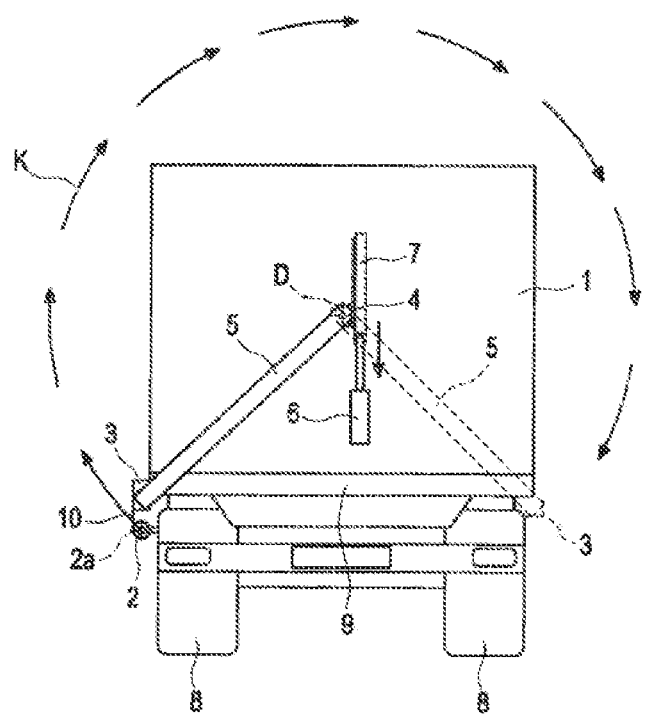
Figure 3:
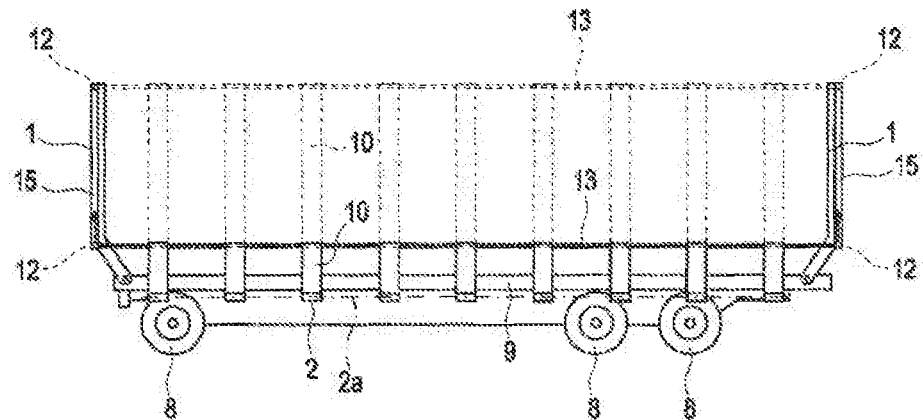
Figure 3:
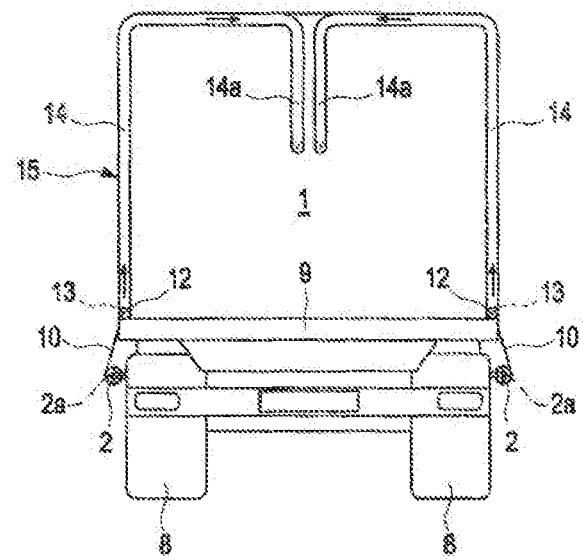
Figure 3C:
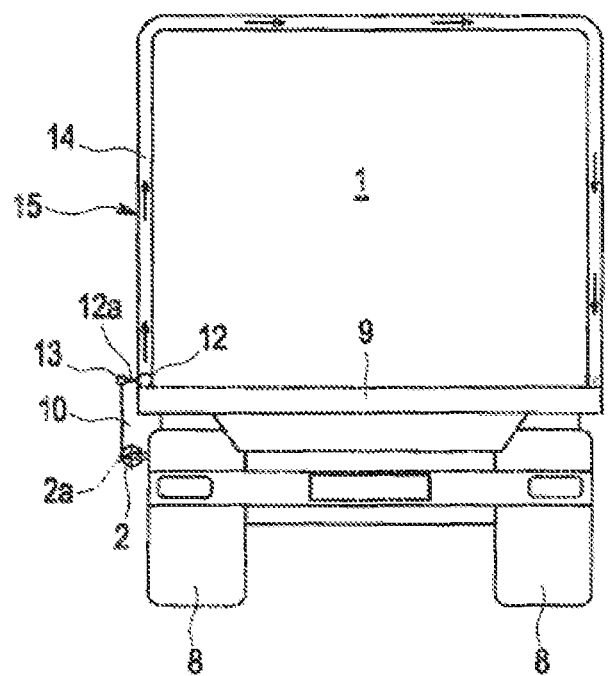
FIG. 3c shows a rear view of the transport carriage according to the invention according to an alternative third embodiment.
Figure 3D:
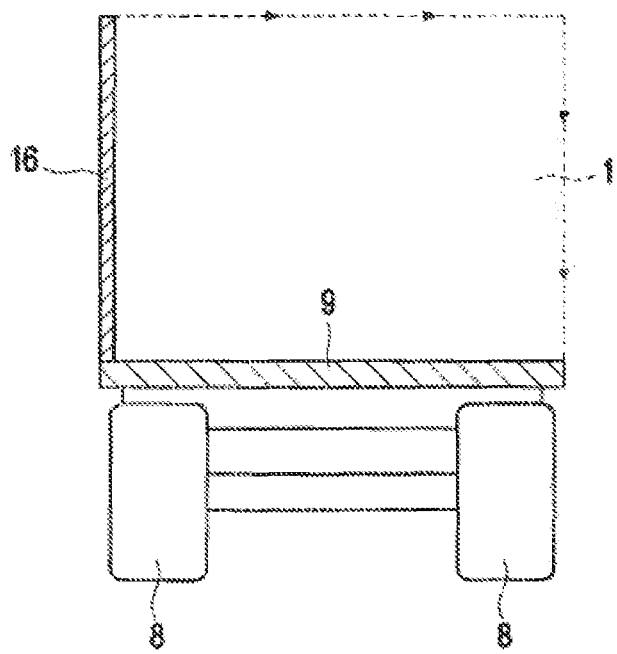
FIG. 3d shows a rear view of the transport carriage according to the invention according to an alternative fourth embodiment.
Figure 4A:
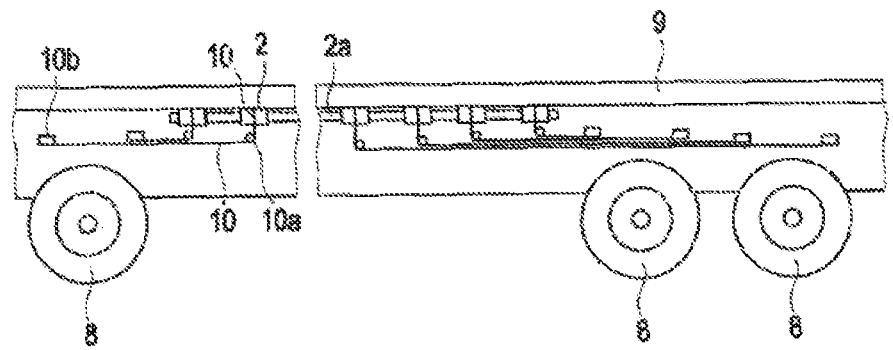
FIG. 4a shows a partial sectional view of a transport carriage according to the invention according to an alternative fifth embodiment.
Figure 4B:
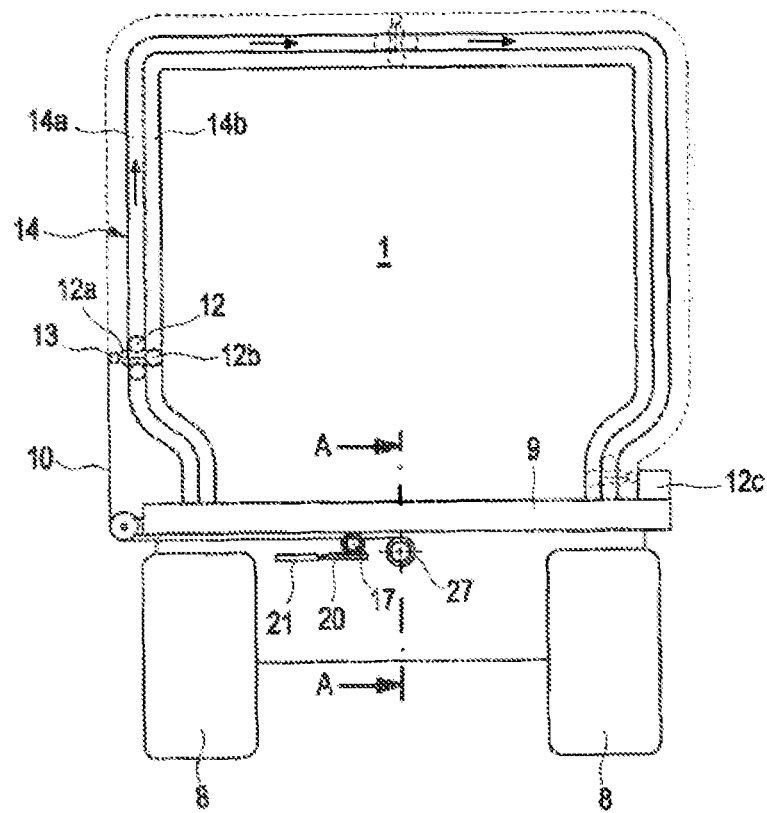
Figure 4:
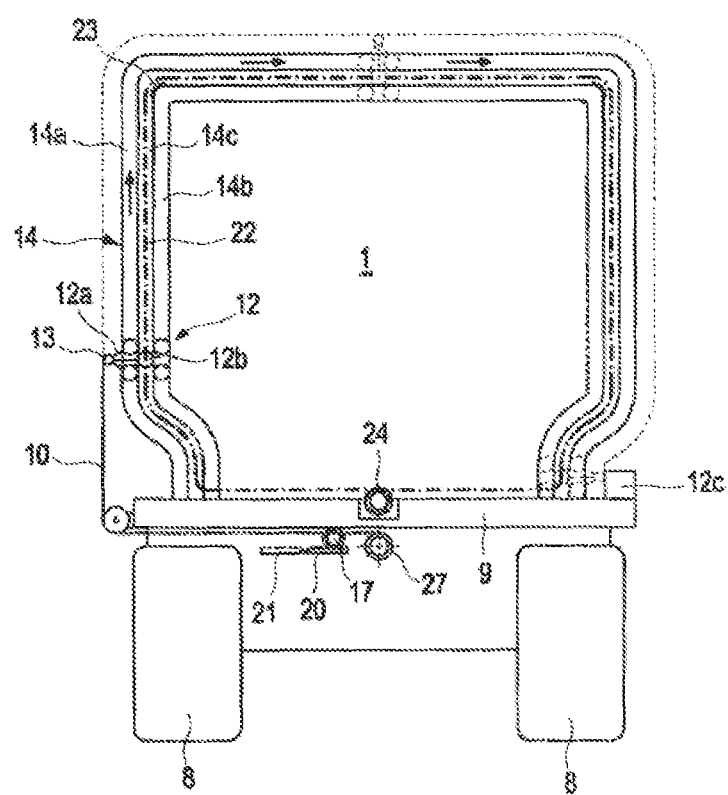

FIGS. 2a and 2b show a first variant according to the invention of a transport carriage in a side and/or rear view, whilst FIGS. 3a, 3b show a second variant according to the invention of a transport carriage in a side and/or rear view. In FIGS. 3c and 3d, two further variants according to the invention of a transport carriage are shown in a rear view. FIGS. 4a-4c show further variants according to the invention of a transport carriage in a rear view and/or in a partial sectional view (FIG. 4a) whilst FIG. 5 finally shows a tensioning device of the transport carriage according to the invention in more detail. Features which coincide have been referenced by the same reference numerals.

In the first variant of a transport carriage according to the invention in each case a conveying device which comprises a retaining arm 5 is provided on the transverse side part 1 of the transport carriage according to the invention. A guide bar 3 which, with a rotational movement of the retaining arms 5, performs a circular displacement motion K about a rotational axis D (see FIG. 2b) extends between the retaining arms 5 along the longitudinal extent of the transport carriage.

The free ends of a plurality of strap-shaped tensioning means are fastened to the guide bar 3. By a displacement of the guide bar 3 these are moved accordingly therewith. The strap-shaped tensioning means are in turn wound onto strap rollers 2 and as a result of the circular displacement movement of the guide bar may be unwound from the strap rollers 2. To this end, the strap rollers 2 are rotatably arranged on an axle 2a.

The two transverse side parts 1 not only support the retaining arms 5 but also a drive device provided therefor, which in the example shown is made up of a hydraulic cylinder 6 and a toothed drive rod 7 and, by a force transmission at the point of application of force 4, causes a pivoting motion of the retaining arm 5 about the rotational axis D.

In principle, however, instead of the drive device shown it is naturally also conceivable to provide an alternative system for driving the retaining arms 5, for example an electric motor, or a hydraulic or pneumatic drive.

In the second embodiment of FIGS. 3a and 3b, no retaining arms 5 which are moved around the rotational axis D are arranged in the region of the transverse side parts 1. Instead, the transverse side parts in each case encompass a retaining frame 15 which may comprise one or more guide rails 14 (see FIG. 3b). In contrast to the first embodiment, moreover, rather than a guide bar a guide rope 13 is tensioned between the two retaining frames 15, said guide rope being connected with its end portions to guide parts 12. The guide parts 12, for example in the form of pins or the like, are in turn able to be displaced in the guide rails 14 of the retaining frame 15 and received so as to be guided. By a displacement of the guide parts 12 in the front and rear retaining frame 15 a displacement of the guide rope 13 is caused in a similar manner as in the first variant, whereby the free ends of the strap-shaped tensioning means 10 connected thereto are also accordingly displaced.

The guide parts 12 may naturally also be configured so as to be able to be fixed in the guide rails 14, for example by providing a fixing mechanism in the form of an adjusting screw or the like.

Also in this variant, the strap-shaped tensioning means 10 may be rolled onto strap rollers 2 and may be unrolled therefrom.

In a particularly expedient embodiment, it may be provided in both variants of the present invention that the strap rollers 2 are part of a tensioning device for tensioning the strap-shaped tensioning means. Such a tensioning device may comprise, for example, a hollow shaft and an axle arranged therein on which the at least one tensioning means is able to be wound and unwound by a rotational movement of the axle relative to the hollow shaft. In this case, the rotational movement of the axle may be driven, for example, by motor or manually introduced.

Figure 5:
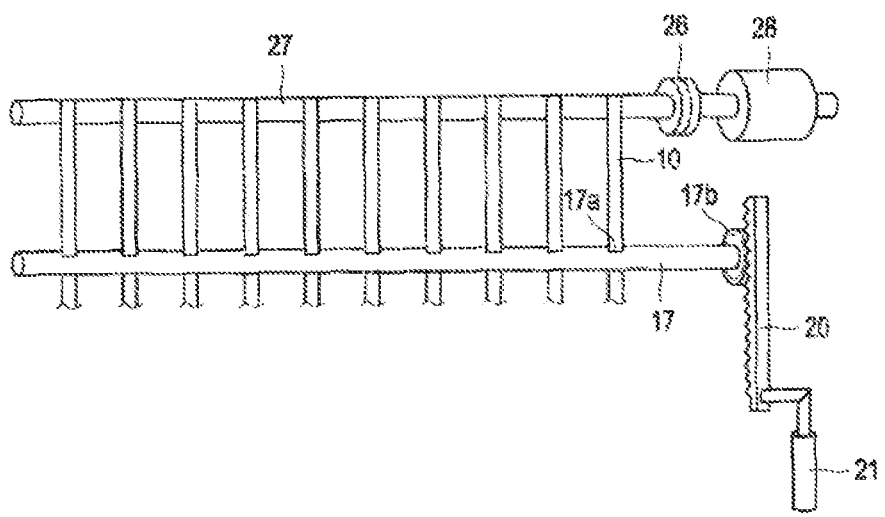
FIG. 5 shows a detailed view of a tensioning device of a transport carriage according to the invention.

Alternatively to this variant of a tensioning device, a further embodiment is shown in FIG. 5. The tensioning device shown there comprises, instead of the axle 2*a*, a driven shaft 27 for winding-on and unwinding the strap-shaped tensioning means 10. The strap-shaped tensioning means 10, as in other embodiments, may be wound onto strap rollers which are connected fixedly in terms of rotation to the shaft 27 or connected at one of their free ends to the shaft 27. The shaft 27, for example, may be driven hydraulically via a schematically shown hydraulic drive 28. Torque limiters 26, such as for example a ratchet coupling or overload slipping clutch or the like, which serve for overload protection of the shaft 27 and the associated drive 28 may be provided at the interface between the shaft 27 and the tensioning means 10.

In addition to the shaft 27, a so-called tensioning shaft 17 is provided, said tensioning shaft serving for automatic tensioning and, in particular, for securing the tensioned strap-shaped tensioning means 10. To this end, the tensioning shaft 17 comprises one or more slot-shaped openings 17*a*, the strap-shaped tensioning means 10 being able to extend through the shaft 27 through said slot-shaped openings. In an initial position, the strap-shaped tensioning means 10 extend straight through the tensioning shaft 17.

If the tensioning shaft 17, however, is intended to be used for retensioning or, in particular, for securing the strap-shaped tensioning means 10, the tensioning shaft 17 is rotated by a predetermined angle about its longitudinal axis, whereby the strap-shaped tensioning means 10 which extend through the at least one slot-shaped opening 17*a* are brought to bear against the outer surface of the tensioning shaft 17.

For rotating the tensioning shaft 17, for example as shown in FIG. 5, an additional drive may be used, said drive in the embodiment shown comprising a toothed rod 20 which may be set in translatory motion by means of a hydraulic cylinder 21. A gearwheel 17*b* which is in engagement therewith and which is connected to the tensioning shaft 17 or integrally configured thereon, is thereby transferred into a rotational movement.

In a desired position of the tensioning shaft 17 in which the strap-shaped tensioning means 10 are tensioned and bear against the outer surface of the tensioning shaft 17, the tensioning shaft 17 itself or a drive component of the tensioning shaft 17 may be secured in its position. In this case, for example, a mechanical locking of the toothed rod 20 is conceivable, said toothed rod being able to be locked, for example, by a pin or the like to the carriage frame 9. Alternatively, however, it is also conceivable to provide a corresponding locking valve on the hydraulic drive which holds the toothed rod 20 reliably in its desired position. Further alternative embodiments are naturally also conceivable.

In order to ensure a secure bearing of the strap-shaped tensioning means 10 on the outer surface of the tensioning shaft 17, said tensioning shaft may provide an improved static friction at least in the regions in which the strap-shaped tensioning means 10 may be brought to bear. This may take place by a corresponding surface structure of the tensioning shaft itself or by additional elements which may be attached to the tensioning shaft. For example, on its external peripheral surface the tensioning shaft may be roughened, it may comprise a coating (for example a rubber coating) or shell-shaped rubber elements, or elements with spikes or the like may be attached to the tensioning shaft 17. The additional elements, such as for example shell-shaped rubber elements, may be attached to the tensioning shaft 17, for example by screwing, adhesive bonding or the like.

In particular, in the embodiments in which such an additional tensioning shaft 17 is intended to be provided for securing the strap-shaped tensioning means 10, an arrangement of the tensioning device on the underbody of the transport carriage is particularly advantageous and space-saving. Such an arrangement, for example, is shown in FIG. 4*b*. Moreover, by means of an additional tensioning shaft 17, a retensioning of the tensioning means may take place at any time without the fixing of the tensioning means having to be released therefor.

As shown, however, with reference to FIG. 4*a*, which is a view of FIG. 4*b* along the line A-A, a further technical problem results therefrom. Thus in a corresponding arrangement, the maximum extent of the components of the tensioning devices in the longitudinal direction (i.e. parallel to the longitudinal axis of the loading platform) through the wheel axles of the wheels 8 of the transport carriage are limited. As, however, the region of the loading platform is also intended to be used to receive and secure cargo which is located above the wheel axles of the wheels 8 of the transport carriage, it is necessary to deflect at least one of the strap-shaped tensioning means 10 at least partially from the region between the wheel axles into a region above the wheel axles. To this end, according to the invention a deflection device may be provided.

In the embodiment shown, for each strap-shaped tensioning means 10 to be deflected, this deflection device comprises a pair of pulleys which serve for deflecting and crossing over the strap-shaped tensioning means 10. Thus a strap-shaped tensioning means 10 which extends substantially perpendicular to the longitudinal axis of the transport carriage from the region between the wheel axles, is crossed over by a first pulley 10*a* and deflected by 90° so that it now extends substantially parallel to the longitudinal axis of the transport carriage and thus also to the loading platform (to the front or to the rear). By means of the second pulley 10*b* the tensioning means 10 may be crossed over again and at the same time deflected by 90° so that the strap-shaped tensioning means 10 now extends again transversely, i.e. approximately at a 90° angle to the longitudinal axis of the loading platform. Proceeding therefrom, the deflected tensioning means 10 may also be used, for example, in the region above the wheel axles, i.e. above the wheels 8 for tensioning corresponding cargo.

Instead of the two guide rails 14 shown in FIG. 3*b*, which have a portion which protrudes into the cargo area of the transport carriage (portion 14*a* in FIG. 3*b*), a single peripheral guide rail or a substantially peripheral guide rail may also be provided, as for example shown in FIG. 3*c*. Moreover, as also shown in the embodiment of FIG. 3*c*, a connecting part 12*a* may be provided between the respective guide part 12 and the guide rope 13, said connecting part providing a larger strapping radius through the strap-shaped tensioning means (see FIG. 3*c*). Such a connecting part 12*a* may, for example, be configured as a rigid bar and is connected at one end to the guide part 12, whilst at the other end it is configured to receive a portion of the guide rope 13.

In the embodiment of FIG. 4*b* and the embodiment of FIG. 4*c*, it may be seen that instead of an individual guide rail at least two or even three rails 14*a*, 14*b* and 14*c* running adjacent to one another are provided as the guide rail 14. The additional rails 14b serve in this case for guiding one or more force compensation rollers 12b (in FIG. 4c two), which are intended to prevent the tilting of the connecting part 12a and thus the sagging of the guide rope. To this end, via these rollers a retaining force opposing a tilting motion is introduced into the connecting part 12a connected thereto. The embodiment as rollers is advantageous in this case, in particular since said rollers may be guided with low friction in the guide rail 14b, if the guide rope 13 is intended to be displaced. In this case, a single force compensation roller 12b (FIG. 4b) or a plurality of force compensation rollers 12b (FIG. 4c) may be provided. In a similar manner, the guide part 12 itself may be provided as a roller or with rollers in order to ensure it runs in the guide rail 14a with low friction.

As shown in FIG. 4c, the third guide rail 14c may be used for receiving and guiding a drive means, as in the present case a drive chain 22. In this case, pulleys 23 may be provided for the drive chain 22 in the deflection regions in which the guide rail 14a has a radius, alternately or additionally to the radius provided. The drive chain 22 may be driven, as shown, via at least one drive wheel 24. The pulleys 23 and the at least one drive wheel 24 may additionally be provided with an external toothing in order to permit a defined engagement in the drive chain 22 and a force transmission with low losses. The drive chain 22 itself is in turn connected to the connecting part 12a, the guide part 12 and/or the force compensation rollers 12b. In order to avoid the jamming of the guided arrangement, the arrangement shown in FIG. 4c in which the drive force is introduced between the guide parts 12 configured in the shape of rollers and the force compensation rollers 12b is particularly advantageous.

A further detail of the embodiment of FIGS. 4b and 4c is in the guide rail arrangement 14 which is curved in the transition region to the loading platform. This serves for securing the guide arrangement, in particular of the connecting part 12a, which in its initial position (if the load is unsecured) and in its operating position (if the load is secured and the guide rope 13 or the tensioning means 10 attached thereto are secured) does not protrude substantially over the lateral dimensions of the loading platform and is thus protected from inadvertent tearing or buckling.

The fixing of the guide rope 13 and/or the tensioning means 10 may take place in very different ways, for example mechanically by a pin or the like (indicated by the fixing unit 12c) or even by the conveying device which in turn may be secured in the desired position, as already described above in connection with the tensioning device of FIG. 5.

As already indicated above, it may also be sufficient if the guide rail 14 circulates sufficiently far from a longitudinal face of the transport carriage to the opposing longitudinal face that the load is fixed and/or the guide rope may be reached by an operator standing on the ground.

Also in a further embodiment according to FIG. 3d it is conceivable that a rigid side wall 16 is provided on one of the longitudinal sides, said rigid side wall defining the loading platform of the carriage frame 9 on one of its longitudinal sides. From this rigid side wall the tensioning means may be enclosed to such an extent that the load is fixed and/or the guide rope may be reached by an operator standing on the ground. According to the invention both a conveying device with at least one retaining arm (see FIGS. 2a, 2b) and a conveying device with at least one retaining frame (see FIGS. 3a to 3c) may be used for partial or complete enclosure of the loaded cargo.

The fixing of the tensioning means in the desired position may be achieved in each of the embodiments described above by means of the conveying device itself which retains said tensioning means in the desired position or by means of an additional fixing unit. Said additional fixing unit may, in particular, be configured as mechanical fixing unit 12c (see FIG. 4a, 4b) which may comprise a pin, a hook or the like.

Naturally, also in the first variant of FIGS. 2a, 2b a guide rope may be used instead of a guide bar. Similarly, vice versa, in the second variant of FIGS. 3a to 3d, the provision of a guide bar may be expedient instead of the guide rope.

Advantageously, by means of the present invention it may be ensured that a single user is able to tension a plurality of strap-shaped tensioning means simultaneously around the cargo loaded on the loading platform in order to secure said cargo. As a result, the drawback known from the prior art of a high operating cost for securing the cargo is avoided, whilst at the same time the flexibility of the known tensioning means is provided for securing very different loads.

The invention claimed is:

1. A transport carriage for cargo comprising:
   a loading platform which is able to reach under the cargo when the transport carriage is in a loaded state, the loading platform having a longitudinal axis extending between a front end and a rear end,
   a strapping system which permits a securing of the cargo on the loading platform and comprises a plurality of tensioning means which are arranged spaced apart from one another and which may be guided at least in sections around the cargo on the platform by means of a common conveying device in order to tension the loaded cargo against the loading platform, wherein
   the loading platform is defined by transverse side parts which comprise the conveying device of the strapping system, wherein
   the plurality of tensioning means may be guided around the cargo loaded on the loading platform by means of the conveying device, and
   a deflection device for deflecting at least one of the plurality of tensioning means at least in sections in a direction substantially parallel to the longitudinal axis.

2. The transport carriage as claimed in claim 1, wherein the deflection device comprises at least one pair of pulleys which are assigned to the tensioning means and which may deflect the tensioning means from a position between a front axle and a rear wheel axle into a position above one of the front or rear wheel axles.

3. The transport carriage as claimed in claim 1, wherein the strapping system comprises a tensioning device for tensioning the plurality of tensioning means.

4. The transport carriage as claimed in claim 3, wherein the tensioning device comprises
   a longitudinal axis,
   a tensioning shaft which is rotatable about the longitudinal axis of the tensioning device, on which the plurality of tensioning means are able to be wound on and off at least in sections by rotating the tensioning shaft.

5. The transport carriage as claimed in claim 4, wherein the tensioning shaft is a hollow shaft having at least one slot-shaped opening shaped and positioned to receive a free end of at least one of the plurality of tensioning means.

6. The transport carriage as claimed in claim 4, wherein the tensioning device comprises structure for imparting a static friction on the tensioning shaft, the static friction selected to secure at least one of the plurality of tensioning means in a tensioned state.

7. The transport carriage as claimed in claim 3, wherein the tensioning device comprises a drive unit and an overload protection.

8. The transport carriage as claimed in claim 1, wherein the conveying device comprises at least one of a guide rope or a guide bar, the at least one of the plurality of tensioning means removably couplable to the conveying device such that the at least one of the plurality of tensioning means may be guided by means of the at least one of the guide rope or the guide bar at least in sections around the cargo loaded onto the loading platform.

9. The transport carriage as claimed in claim 8, wherein the guide bar comprises the tensioning device for tensioning at least one of the plurality of tensioning means.

10. The transport carriage as claimed in claim 1, wherein the conveying device comprises at least one retaining arm for guiding and retaining at least one of a guide rope or a guide bar, wherein the at least one retaining arm is arranged on one of the transverse side parts.

11. The transport carriage as claimed in claim 10, wherein a drive device is assigned to the at least one retaining arm, the at least one retaining arm being able to be displaced by the drive device.

12. The transport carriage as claimed in claim 1, wherein the conveying device comprises at least one retaining frame for guiding and retaining at least one of a guide rope or a guide bar, wherein the at least one retaining frame is arranged on one of the transverse side parts.

13. The transport carriage as claimed in claim 12, wherein the at least one retaining frame comprises at least one guide rail, a portion of the at least one of the guide rope or the guide bar being able to be directly or indirectly received in the guide rail.

14. The transport carriage as claimed in claim 13, wherein a drive device is assigned to the at least one retaining frame, the portion of the at least one of the guide rope or the guide bar which is received in the guide rail being able to be displaced relative to the loading platform.

* * * * *